United States Patent [19]

Klinger

[11] Patent Number: 5,226,679
[45] Date of Patent: Jul. 13, 1993

[54] QUICK CONNECT INSERTION INDICATOR

[75] Inventor: Gary Klinger, Allen Park, Mich.

[73] Assignee: ITT Corporation, New York, N.Y.

[21] Appl. No.: 701,538

[22] Filed: May 16, 1991

[51] Int. Cl.$^5$ .............................................. F16L 35/00
[52] U.S. Cl. ...................................... 285/93; 285/319; 285/921
[58] Field of Search ........................... 285/319, 921, 93

[56] References Cited

U.S. PATENT DOCUMENTS

| 4,915,420 | 4/1990 | Washizu | 285/93 X |
| 4,925,217 | 5/1990 | Ketcham | 265/93 |
| 4,948,176 | 8/1990 | Bartholomew | |

Primary Examiner—Dave W. Arola
Attorney, Agent, or Firm—Robert P. Seitter; J. Gordon Lewis

[57] ABSTRACT

An insertion indication device for use with a quick connect fitting includes a generally annular base member which is adapted for positioning about the male portion of the fitting within the female portion such that in a first position the annular member is disposed between a step formed in the axial female portion opening and a tapered male portion retaining element, and in a second position the annular member is disposed between an abutment surface formed by the retaining element and a housing seat formed within female portion. A number of circumferentially spaced, axially extending legs are visible prior to engagement of the fitting and are hidden from view upon full engagement thereof.

14 Claims, 1 Drawing Sheet

QUICK CONNECT INSERTION INDICATOR

INTRODUCTION

The present invention relates to quick connectors and, more particularly, to quick connectors having a means enabling, by external inspection, determination of proper coupling between the male and female portions of the connector.

BACKGROUND OF THE INVENTION

It is desirable in fluid-handling conduits to ensure that the connectors used have their male and female portions properly coupled together. A faulty connector enables an associated host system to leak fluid. This can be particularly disadvantageous when the system is under pressure and the leaking connector expels the pressurized fluid.

In the quick connector field, where male and female portions of the connectors are held together by friction locking connections, it is important that the male and female portions are properly coupled. To ensure the proper coupling, the installer may tug on or manipulate the connector to make sure that it is properly coupled. Also, visual types of inspecting devices enable the installer to ensure that the male and female portions are properly coupled together.

U.S. Pat. No. 4,925,217 to Ketcham discloses a quick connector with a visual checking feature wherein a deformable member is assembled within the fitting which includes elongated members extending out of the housing between the male and female portions prior to coupling and which are retracted, and no longer visible, once the coupling has been accomplished. Although this type of connector may work satisfactorily for its intended purpose, designers are always trying to improve the field. Furthermore, designs such as that employed by Ketcham, provide only relatively small axial movement of the indicator member, which, when employed with relatively low cost high tolerance manufacturing, limits the reliability of the perceived indication and, alternatively, adds additional expense to a more highly refined design. Lastly, the springlike operation of Ketcham's vaulted annular member requires use of relatively expensive materials and can introduce additional failure modes, such as fracture of one of the legs 46 and 48 which could interfere with proper coupling operation.

BRIEF DESCRIPTION OF THE INVENTION

Accordingly, it is an object of the present invention to provide a visual inspection device which enables, at a glance, the installer to ensure proper coupling of the connector. Also, the present invention provides the art with a simple, inexpensive inspection device that overcomes the shortcoming of the prior art described hereinabove. In the broadest sense, a quick connect insertion indicator includes a base member of generally annular configuration which is adapted for positioning about a male conduit within a connector housing such that in a fist position thereof the annular member is disposed between a step formed in the axial housing opening and a tapered conduit retaining element, and in a second position the annular member is disposed between an abutment surface formed by the retaining element and a housing seat. One or more axially extending flags or legs are carried by the base member whereby a portion of the flag is externally visible when the base member is in the first position and wherein external view of the flag is substantially concealed by the connector housing when the base member is in the second position. This arrangement provides the advantage of a simple, inexpensive design which features a relatively long axial travel of the indicator between its first and second positions to assure clarity of interpretation of coupling condition. This is particularly advantageous in a complex system where numerous couplings are employed wherein with a relatively casual glance, an installer or technician can readily identify a suspect coupling by the fact that a portion of the flag or indicator is still visible.

In the preferred embodiment of the invention, the insertion indicator includes an annular base member and a plurality of circumferentially spaced axially extending legs dimensioned such that in the first position a substantial portion of the legs are externally visible and in the second position substantially all of the extent of the legs are disposed within the connector housing. This arrangement provides the advantage of enabling use of the present invention with existing standard quick connect fittings without the need for expensive modification or retooling.

According to another aspect of the invention, one or more of the legs carry radially outwardly extending tabs, each of which defines a leading edge ramped surface and a trailing edge abutment surface. The tab extends radially outwardly of the axial housing step whereby upon axial insertion of the indicator within the connector housing, the tab is momentarily displaced radially inwardly by the axial housing step and thereafter resiliently regains its original configuration for positive retention within the connector housing. This arrangement has the advantage of providing a positive lock in place feature for the indicator in either of its operating positions.

According to another aspect of the invention, at least one leg carries a radially inwardly directed tab member which defines leading and trailing edge ramped surfaces. The tab member extends radially inwardly of the outer diameter of the conduit annular bead whereby, upon axial insertion of the conduit within the connector housing, the annular bead ramps up and then down the trailing and then leading edge ramped surfaces to engage the indicator intermediate the trailing edge ramp and the base member. This arrangement provides the advantage of maintaining precise concentric alignment of the indicator and conduit during translation between positions and return of the indicator to the first position upon de-coupling of the quick connector.

According to still another feature of the invention, the free end of the legs include a radially outwardly directed angular offset. This arrangement provides that advantage of enhancing axial alignment of the connector housing and conduit prior to insertion and mating of the coupling.

These and other features and advantages of this invention will become apparent upon reading the following specification, which, along with the drawings, describes and discloses a preferred embodiment of the invention in detail.

A detailed description of the disclosed embodiment makes reference to the accompanying drawings.

DETAILED DESCRIPTION OF THE PREFERRED EMBODIMENT

Figure 1:
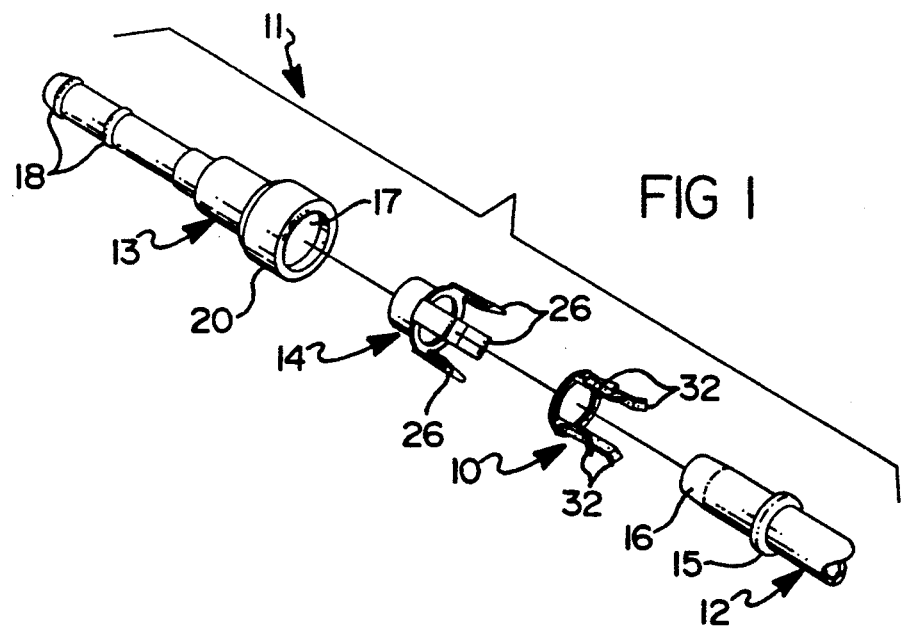
FIG. 1, is a perspective exploded view of a conduit quick connector assembly embodying the present invention.

Referring to FIG. 1, the present invention includes an insertion indicator device 10 for use with a quick connector shown generally at 11, including male and female elements 12 and 13, respectively, and a locking member or retainer 14. With the exception of modifications described hereinbelow, quick connector 11 is representative of known commercially available devices. A quick connector 11 illustrated herein is adapted for application within systems employing tubular conduit, although it is contemplated that the present invention could be employed with other structural configurations.

Male element 12 is illustrated as a thin wall metallic tube with an upset or external circumferential flange 15 integrally formed therein adjacent an end 16 adapted for insertion within a stepped through-passage 17 in female element 13. The end of female element 13 distal male element 12 has a series of external circumferential barbs 18 adapted for locking engagement with a resilient conduit 19 (see FIGS. 2 and 3). Locking member 14 is carried within an enlarged end 20 of female element 13 proximal male element 12 as will be described in greater detail hereinbelow.

Figure 2:
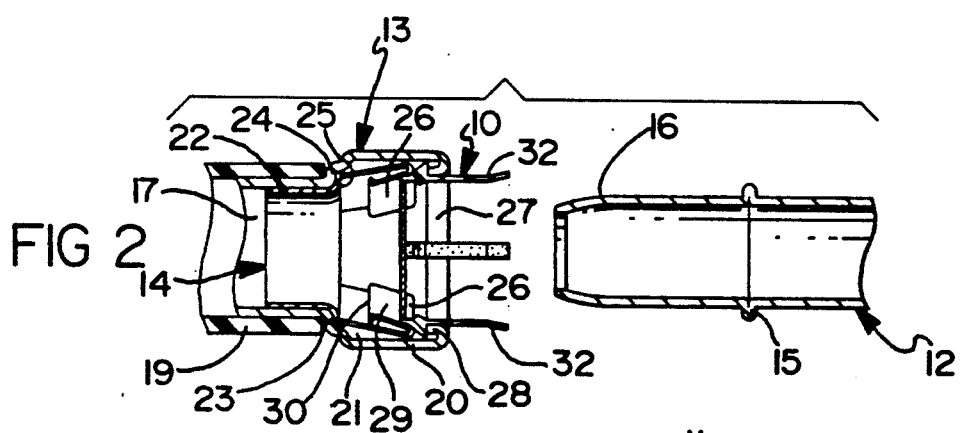
FIG. 2, is a cross-section view, on an enlarged scale of a demated connector housing and male conduit.

As seen in FIG. 2, the through passage 17 of female element 13 includes a step portion 21 within its enlarged end 20. Additional stepped portion may be provided to receive elements such as O-rings or the like (not illustrated) for sealing male element 12.

The retainer 14 comprises a generally tubular base or skirt portion 22 nestingly disposed concentrically within through passage 17 terminating in a radially outwardly extending flange portion 23 received within a step 24 formed in female element 13 at the end thereof opening into step portion 21 and coacting therewith to define a seat 25. Four finger members 26 are integrally formed with flange portion 23 and are circumferentially equally spaced thereabout and extend axially therefrom towards an opening 27 defined by a step 28 formed by the end of female element 13 for receiving male element 12. The free end of fingers 26 are folded rearwardly to define ramp surfaces 29 on the radially inward surface thereof and terminate in a short radially outwardly directed leg defining an abutment surface 30. The portion of finger members 26 closest to step 28 is slightly axially spaced therefrom. Retainer 14 is constructed of suitable material such as spring steel.

Figure 4:
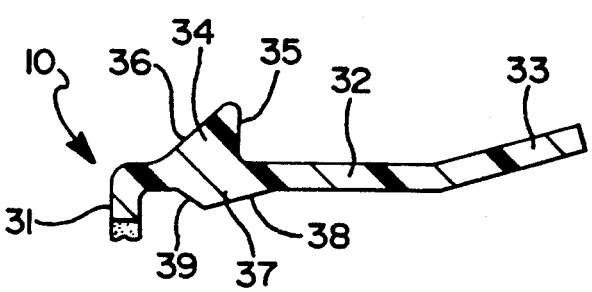
FIG. 4, is a broken section view of a portion of an insertion indicator employed in FIGS. 1 through 3 on a greatly enlarged scale.

Insertion indicator device 10 includes an annular member 31 with four axially extending legs or flags 32 integrally formed adjacent to the outer diameter thereof and circumferentially equally spaced from one another. As can best be seen in FIG. 4, legs 32 are integrally formed with annular member 31 from suitable material such as injection molded plastic. FIG. 4 illustrates only one leg 32, it being understood that each is of similar configuration. Each leg 32 depends from annular member 31 and extends axially approximately two thirds of its length at which point it forms an outwardly directed angular offset 33 of about 15 degrees for the remainder of its length. The offsets 33 cooperate with one another to serve as an alignment guide for an approaching male element 12 prior to insertion within female element 13. Device 10 is injection molded of brightly colored material to enhance its visibility, particular when in a position illustrated in FIG. 2.

Each leg 32 has a radially outwardly directed wedge or tab 34 integrally formed therewith near its point of connection with annular member 31. Each tab 44 forms an abutment surface 35 at the leading edge thereof facing opening 27 and a trailing tapered ramp surface 36. Each leg 32 has a similar radially inwardly directed wedge or tab 37 radially opposite tab 34 defining leading and trailing tapered ramp surfaces 38 and 39, respectively. The operation of tabs 34 and 37 are described in detail hereinbelow.

As viewed in FIG. 2, insertion device 10 is illustrated in a first position indicative of nonengagement between male and female elements 12 and 13. A substantial portion of legs 32 extend externally of female element 13 through opening 27 in a highly visible fashion. Insertion device 10 is retained in its illustrated position by the outer diameter of annual member 31 bearing leftwardly against ramp surfaces 29 of finger members 26 and rightwardly against step 28 of female element 13. The inner diameter of annular member 31 is dimensioned so that end 16 of male element 12 can freely pass therethrough.

As can best be seen in FIG. 1, retainer 14 and insertion device 10 are angularly positioned so that legs 32 are interdigitated with and nominally positioned approximately 45 degrees from the respective adjoining finger members 26 of retainer 14 so that the two can be axially repositioned without interfering with one another. During insertion assembly, initial device 10 is merely pressed into its position as illustrated in FIG. 2 wherein tabs 34 are momentarily elastically displaced radially inwardly as ramp surfaces 36 axially pass over step 28.

Figure 3:
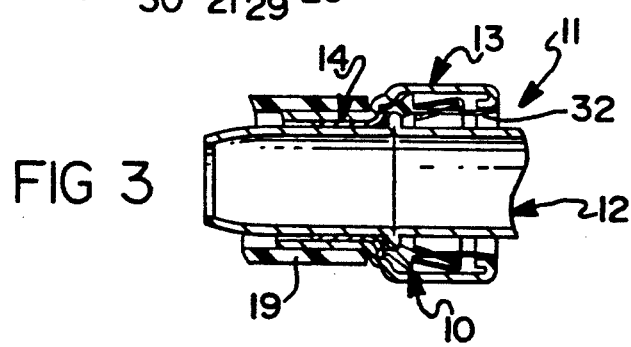
FIG. 3, represents the connector housing and male conduit of FIG. 2 in the coupled condition.

Referring to FIGS. 2 and 3 during the mating process of connector 11, end 16 of male member 12 enters through passage 17, passing through the inner diameter of annular member 31 as well as retainer base portion 22. Flange 15 of male element 12 is dimensioned for slip fit with respect to the inner surfaces of legs 32. As the insertion process continues, the leading (leftwardmost) edge of flange 15 contacts ramp surfaces 38 of tabs 37 and begins to displace insertion device 10 axially therewith. Ramp surfaces 29 of finger member 26 will initially resist leftward displacement of insertion device 10, causing flange 15 to continue its relative leftward displacement with respect thereto, thereby momentarily radially outward displacing tabs 37 and seating against annular member 31. At that point, flange 15 is entrapped between member 31 and ramp surface 39. Further leftward displacement of male element 12 will carry insertion device 10 therewith springing finger members 26 radially outwardly as it passes thereby.

Insertion is complete when the leading (leftwardmost) edge of annular member 31, driven by circumferential flange 15 abuts seat 25. At this point, the trailing edge of flange 15 has passed leftwardly facing abutment surfaces 30 of finger members 26 which then snap radially inwardly, entrapping flange 15 as well as indicator device in its designated second position as illustrated in FIG. 3. In this position, the entire extent of legs 32 are drawn axially within passage 17 to obstruct the view thereof by an assembly technician and thereby confirm that mating of quick connector 11 has taken place.

Legs 32 are formed with a relatively thin cross-section and thus do not interfere with the use of convention quick connect release tools.

Upon removal of male element 12 through momentary radial outward repositioning of ramp surfaces 29 of finger members 26, male element 12 is removed axially. During its initial displacement, indicator device 10 will be carried with male element 12 by virtue of flange 15 remaining trapped between annular member 31 and ramp surfaces 39. Just prior to flange 15 passing by step 28 of female element 13, abutment surfaces 35 of tabs 34 will contact step 28 wherein upon indicator device 10 has returned to its first position. Upon further rightward displacement of male element 12, the outer surface of flange 15 will ramp up surfaces 39, momentarily radially outwardly displacing tabs 37 and then down ramp surfaces 38 for subsequent removal imparting from indicator device 10 in the position illustrated in FIG. 2.

It is to be understood that the invention has been described with reference to a specific embodiment and variations to provide the features and advantages previously described and that embodiment is susceptible of modification as will be apparent to those skilled in the art. For example, it is contemplated that legs 32 could be replaced with a thin wall circumferentially continuous skirt. Additionally, it is also contemplated rather than extending externally of female element 13, legs 32 could remain internal to female element 13 but be selectively in register with viewing windows in the first position and not aligned with the viewing windows in a second position. Accordingly, the foregoing is not to be construed in a limiting sense.

What is claimed is:

1. A quick connect insertion indicator comprising:
a generally annular base member having retaining means for retaining said annular base member within a connector housing, said annular base member adapted for positioning about a conduit within said connector housing such that in a first position said annular member is retainingly engaged intermediate a stepped axial housing opening and a tapered conduit retaining element, and in a second position said annular member is retainingly engaged intermediate an abutment surface formed in said conduit retaining element, and a connector housing seat, said conduit being adapted to displace said base member upon insertion of said conduit into said housing; and
at least one axially extending flag carried by said base member, wherein a portion of said flag is externally visible when said base member is in said first position and wherein external view of said flag is substantially concealed by said connector housing when said base member is in said second position.

2. A quick connect insertion indicator comprising:
a generally annular base member having retaining means for retaining said annular base member within a connector housing, said annular base member adapted for positioning about a conduit within said connector housing such that in a first position said annular member is retainingly engaged intermediate a stepped axial housing opening and a tapered conduit retaining element, and in a second position said annular member is retainingly engaged intermediate an abutment surface formed in said conduit retaining element, and a connector housing seat, said conduit being adapted to displace said base member upon insertion of said conduit into said housing; and
a plurality of circumferentially spaced, axially extending legs carried by said base member, wherein a portion of each said leg extends externally of said connector housing when said base member is in said first position and wherein substantially all of each said leg is disposed within said connector housing when said base member is in said second position.

3. The insertion indicator of claim 2, wherein said base member and legs are integrally formed of injection molded plastic.

4. The insertion indicator of claim 2, wherein said base member is positioned in said second position in conjunction with coupling of a conduit annular bead intermediate said retaining element abutment surface and connector housing seat.

5. The insertion indicator of claim 4, wherein said annular base member has an outside diameter dimensioned slightly greater than the minimal inside diameter dimension of said axial housing step and an inside diameter dimensioned slightly greater than the minimal outside diameter dimension of said conduit and slightly less than the outside diameter dimension of said conduit annular bead.

6. The insertion indicator of claim 5, wherein at least one leg includes said retaining means which includes a tab member defining a leading edge ramped surface and a trailing edge abutment surface, said tab member extending radially outwardly of said axial housing step, whereby upon axial insertion of said indicator within said connector housing, said tab member is momentarily displaced radially inwardly by said axial housing step and thereafter resiliently regains its original configuration intermediate said abutment surface and connector housing sent for positive retention within said connector housing.

7. The insertion indicator of claim 5, wherein at least one leg has a radially outwardly directed angular offset near an outwardmost end thereof.

8. The insertion indicator of claim 5, wherein at least one leg carries a radially inwardly directed tab member defining leading and trailing edge ramped surfaces, said tab member extending radially inwardly of said outer diameter of said conduit annular bead, whereby upon axial insertion of said conduit within connector housing, said annular bead ramps up and then down said trailing and then leading edge ramped surfaces to engage said indicator intermediate said trailing edge ramp and the base member.

9. In combination:
a quick connector assembly including mating male and female elements and locking means operative to positively interconnect said elements in a fixed relative longitudinal orientation, said female element defining a housing portion substantially enclosing said locking means, said housing portion forming a radially inwardly directed step at an open end thereof for receiving said male element and a seat at an end opposed from said open end, said male element defining an external annular bead dimensioned to be nestingly received by said seat, and said locking means defining a plurality of circumferentially spaced, axially extending resilient finger members defining radially inwardly directed ramp surfaces and abutment surfaces at an end thereof distal said housing open end operative to entrap said bead between said seat and abutment surfaces; and an insertion indicator including a generally annular base member adapted to be disposed about said male element within said female element such that in a first position said annular member is retainingly engaged intermediate said housing step and said ramp surfaces, and in a second position said annular member is retainingly engaged intermediate said abutment surfaces and said seat, said conduit being adapted to displace said base member upon insertion of said conduit into said housing, said insertion indicator further including a plurality of circumferentially spaced, axially extending legs carried by said base member, wherein a portion of each said leg extends externally of said housing portion, when said base member is in said first position and wherein substantially all of each said leg is disposed within said housing portion when said base member is in said second position.

10. The combination of claim 9, wherein said finger members are equally circumferentially spaced.

11. The combination of claim 9, wherein said legs are equally circumferentially spaced.

12. The combination of claim 9, wherein there are an equal number of finger members and legs.

13. The combination of claim 12, wherein said finger members and legs are circumferentially interdigitated.

14. The combination of claim 12, wherein there are four finger members and four legs.

* * * * *